United States Patent
Cansler, Jr. et al.

(10) Patent No.: US 8,561,113 B2
(45) Date of Patent: Oct. 15, 2013

(54) AUGMENTING TELEVISION CONTENT WITH ON-SCREEN RECORDING, ORDERING, SEARCHING AND VOIP CALLING OPTIONS

(75) Inventors: James L. Cansler, Jr., Pflugerville, TX (US); Lee Allan Culver, San Antonio, TX (US); Brett A. Anderson, Fair Oaks Ranch, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1576 days.

(21) Appl. No.: 11/203,659

(22) Filed: Aug. 12, 2005

(65) Prior Publication Data

US 2007/0039020 A1 Feb. 15, 2007

(51) Int. Cl.
G06F 13/00 (2006.01)
G06F 3/00 (2006.01)

(52) U.S. Cl.
USPC .................................. 725/61; 725/51; 725/87

(58) Field of Classification Search
USPC ........... 725/51, 60, 112, 113, 32, 40, 4, 2, 61, 725/87
See application file for complete search history.

(56) References Cited

U.S. PATENT DOCUMENTS

| 5,715,399 | A | * | 2/1998 | Bezos .............................. 705/27 |
| 5,905,865 | A | * | 5/1999 | Palmer et al. .................. 725/112 |
| 6,177,931 | B1 | * | 1/2001 | Alexander et al. .............. 725/52 |
| 6,438,751 | B1 | * | 8/2002 | Voyticky et al. ................. 725/42 |
| 6,762,773 | B2 | * | 7/2004 | Kolde et al. .................... 715/716 |
| 7,120,235 | B2 | | 10/2006 | Altberg et al. |
| 2001/0013125 | A1 | * | 8/2001 | Kitsukawa et al. .............. 725/36 |
| 2003/0028873 | A1 | * | 2/2003 | Lemmons ........................ 725/36 |
| 2003/0093790 | A1 | | 5/2003 | Logan et al. |
| 2003/0151621 | A1 | | 8/2003 | McEvilly et al. |
| 2004/0221308 | A1 | * | 11/2004 | Cuttner et al. ................... 725/46 |
| 2005/0015815 | A1 | * | 1/2005 | Shoff et al. .................... 725/135 |
| 2005/0166230 | A1 | | 7/2005 | Gaydou et al. |
| 2006/0004627 | A1 | | 1/2006 | Baluja |
| 2006/0242663 | A1 | * | 10/2006 | Gogerty .......................... 725/34 |
| 2006/0271971 | A1 | * | 11/2006 | Drazin ............................ 725/86 |

OTHER PUBLICATIONS

Seinfeld Blog, (accessed Jun. 25, 2008). http://www.stanthecaddy.com/seinfeld-dvds-released-discuss.html.*
International Search Report for International Application No. PCT/US06/27232, mailed on Jan. 26, 2007.
Written Opinion of the International Searching Authority for PCT/US06/27232, mailed on Jan. 26, 2007.

* cited by examiner

Primary Examiner — Hunter B Lonsberry
(74) Attorney, Agent, or Firm — Toler Law Group, PC

(57) ABSTRACT

Metadata associated with television commercials and television programs are received and stored in a local database at a customer premise. When received at the customer premise, those television commercials and television programs identified by the metadata are augmented with on-screen options that are user-selectable using a remote control device. A first option is to automatically record an upcoming broadcast of a first program advertised in a first commercial. A second option is to purchase a media product that includes the first program. A third option is to order a product or a service shown during a second program or a second commercial. A fourth option is to initiate a search of an inventory of a local retailer for the product or the service shown during the second program or the second commercial. A fifth option is to place a VoIP call to a vendor of the product or the service.

14 Claims, 4 Drawing Sheets

AUGMENTING TELEVISION CONTENT WITH ON-SCREEN RECORDING, ORDERING, SEARCHING AND VOIP CALLING OPTIONS

FIELD OF THE DISCLOSURE

The present disclosure relates to video set-top boxes.

BACKGROUND

Television services are delivered to subscribers via direct broadcast satellites, cable television plants, and the Internet. For some television services, a video set-top box is used at a subscriber premise to enable the television service to be displayed on a television set.

Like other non-personal-computer environments, a video set-top box environment may not provide users access to a mouse and a standard keyboard. As a result, these users may not be given typical personal computer (PC) graphical user interface (GUI) components such as checkboxes, radio dials and double-clicking to control features provided by the television service.

DETAILED DESCRIPTION OF THE DRAWINGS

Embodiments of the present disclosure provide a television receiver, such as a video set-top box, having a local database that stores metadata in anticipation of receiving television content items such as television programs and television commercials. The television content items may be either broadcast items, video-on-demand items, near-video-on-demand items, or other video items.

The metadata identifies particular television content items and any on-screen options that are to be simultaneously displayed therewith. If a received television content item has an identifier that matches an identifier within the stored metadata, the video set-top box augments the television content item with one or more on-screen options indicated by the stored metadata. Potential on-screen options include an automatic program recording option, a media product purchasing option, a product or service purchasing option, an inventory searching option, a Voice over Internet Protocol (VoIP) calling option and a more-information option. The on-screen options are individually selectable using either a remote control of the television receiver or another user input device that supports only a limited number of actions.

The on-screen options enable viewers to interact with information displayed in the television content items. Viewers benefit by being able to interact with information that is displayed for a short duration or may be misunderstood. Viewers further benefit by being provided a medium to immediately act on information in television content items without manually accessing the Internet (e.g. without typing a computer address such as a uniform resource locator) or manually dialing a telephone number.

Figure 1:
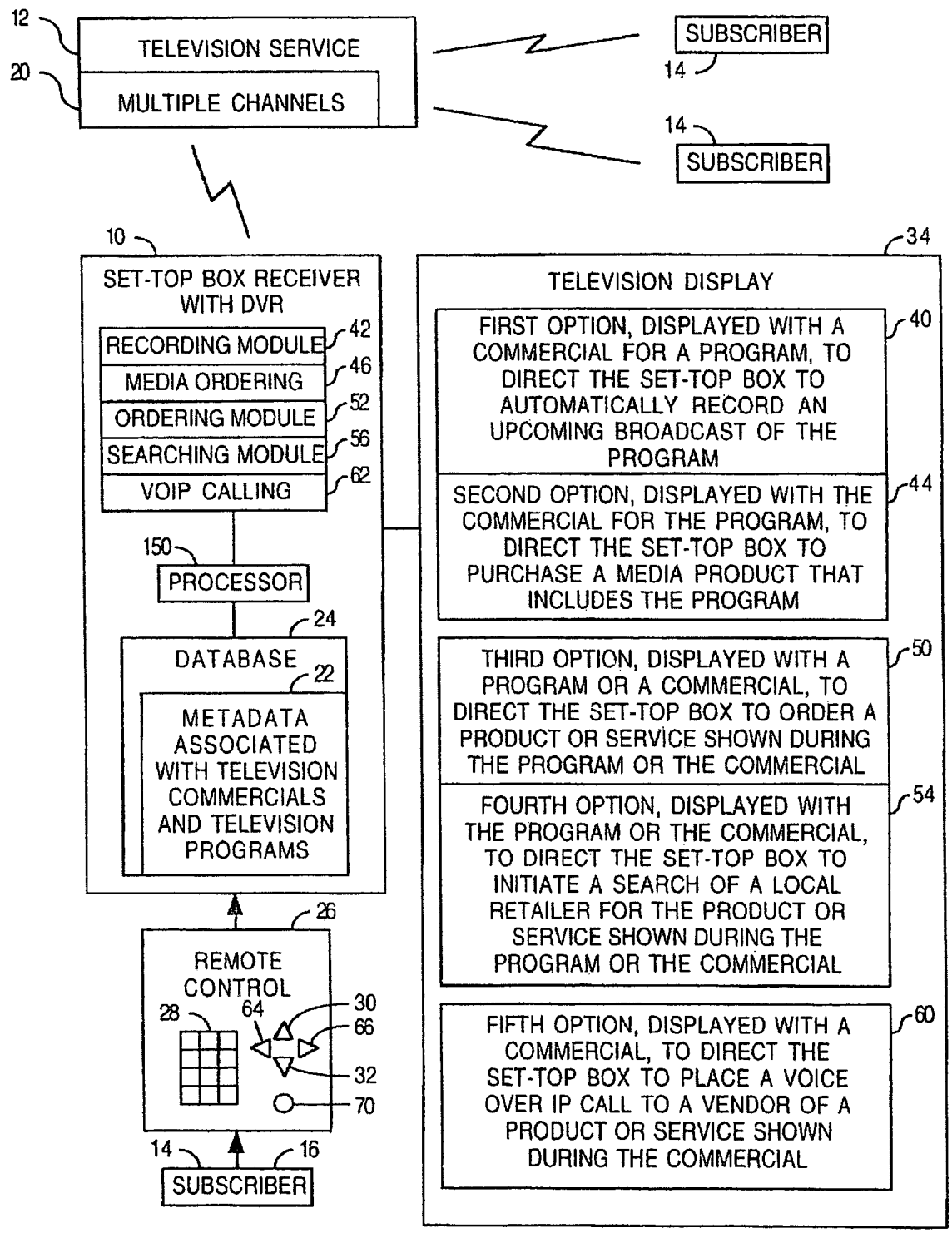
FIG. 1 is a block diagram of an embodiment of a system for augmenting television programs and television commercials with one or more on-screen options.
Figure 6:
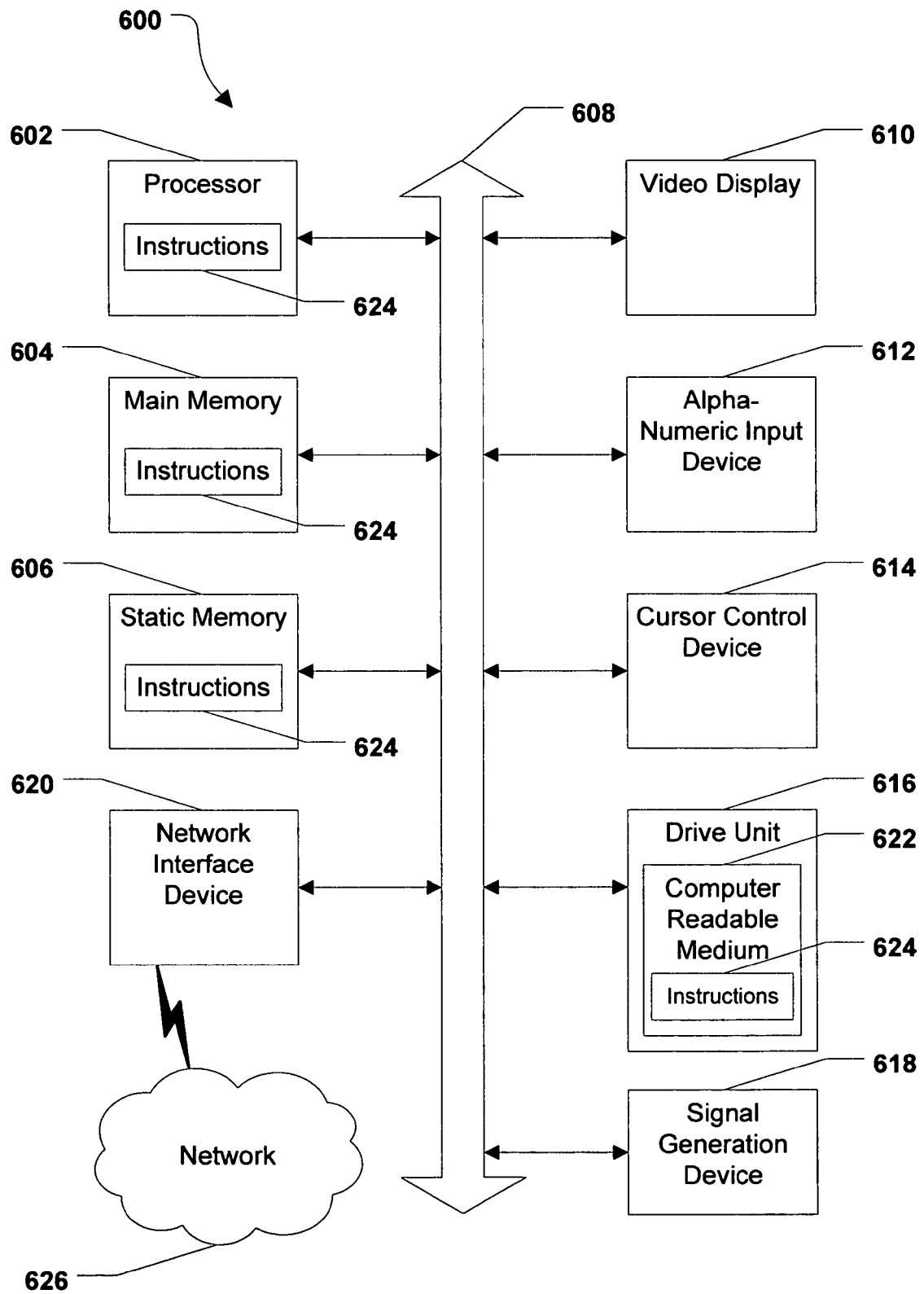
FIG. 6 is a block diagram that is representative of a general computing system.

FIG. 1 is a block diagram of an embodiment of a system for augmenting television programs and television commercials with one or more on-screen options. The system comprises a set-top box receiver 10 that provides a receiver and a digital video recorder for a television service 12. FIG. 6, described below, depicts an exemplary non-limiting embodiment of a computing system. The set-top box receiver 10 may incorporate one or more of the features of the computing system described below in conjunction with FIG. 6.

The television service 12 is broadcast to multiple subscribers 14 that can include a subscriber 16 that is associated with the set-top box receiver 10. The television service 12 is broadcast to the multiple subscribers 14 via either the Internet, one or more satellites, a cable television plant, a terrestrial wireless network including but not limited to a 3G network, a broadband network including but not limited to Digital Subscriber Line (DSL), or any combination thereof. The television service 12 may be part of an Internet Protocol Television (IPTV) service, a satellite television service, or a cable television service, for example. The television service 12 provides multiple channels 20 of television content. The television content includes television programs and television commercials.

The set-top box receiver 10 receives metadata items 22 associated with particular ones of the television programs and television commercials. Each of metadata items 22 includes an identifier of a particular television program or a particular television commercial, and an indication of one or more on-screen options that are to augment the particular television program or the particular television commercial. The set-top box receiver 10 stores the metadata items 22 in a local database 24 in anticipation of their associated television programs and television commercials being broadcast by the television service 12.

The metadata items 22 may be downloaded to the set-top box receiver 10 via any medium. In general, the medium in which the metadata items 22 are delivered can be either the same medium or a different medium in which the television content is delivered. An in-band delivery of the metadata items 22 is an implementation in which television content and metadata items 22 are delivered over the same medium (e.g. satellite, IPTV, cable TV, etc.). An out-of-band delivery of the metadata items 22 is an implementation in which television content is delivered via one medium and the metadata items 22 are delivered via another medium.

The set-top box receiver 10 is responsive to a remote control 26. Using the remote control 26, the subscriber 16 or another user can select which channel of the multiple channels 20 he/she would like to watch. The channel can be selected by a numeric entry on a numeric keypad 28 of the remote control 26, and/or by one or more depressions of a channel-up button 30 or a channel-down button 32 of the remote control 26. The subscriber 16 can make the channel selection in the course of watching television on a television display 34. The television display 34 displays video signals outputted by the set-top box receiver 10.

The set-top box receiver 10 tunes to, receives, and decodes a sequence of one or more television content items in the user-selected television channel. Each of the television content items may be either a television program or a television commercial.

For each television content item, the television service 12 transmits a unique television content item identifier associated therewith. The set-top box receiver 10 receives the television content item identifier and performs a matching operation with the metadata items 22 in the local database 24. If a received television content item has an identifier that matches an identifier within one or more of the metadata items 22, the set-top box receiver 10 augments the television content item with one or more particular on-screen options indicated by the one or more metadata items 22. If no match occurs, the set-top box receiver 10 may provide no on-screen options with the television content item.

For each received television content item for which an on-screen option is to be provided, the set-top box receiver 10 outputs video and audio signals that augment the received television content item with its associated on-screen option (s). Based on the video signals, the television display 34 simultaneously displays a received television content item and each of its one or more particular on-screen options. The audio signals are applied to the television display 34, a home theater audio system or another amplified audio output system to make audio content in the television content item audible to the subscriber 16 or other users.

The set-top box receiver 10 supports at least five different on-screen options. Each on-screen option includes a short message indicating what type of interaction is facilitated in response to a selection thereof by the subscriber 16.

A first option 40 may be displayed with a television commercial that advertises a television program. The first option 40, if selected by the subscriber 16, directs the set-top box receiver 10 to automatically record an upcoming broadcast of the television program by the television service 12.

The set-top box receiver 10 includes a recording module 42 that automatically sets a start time, an end time and a channel number for the DVR to record the television program in response to a selection of the first option 40 during the television commercial. The recording module 42 may be responsive to a metadata item in the local database 24 that identifies the television commercial and further includes parameters for recording the television program.

Either in addition to or as an alternative to the first option 40, a second option 44 may be displayed with the television commercial that advertises the television program. The second option 44, if selected by the subscriber 16, directs the set-top box receiver 10 to purchase a media product that includes the television program. The media product may comprise one or more DVDs that include the television program, for example. If the television commercial advertises an episode of the television program, the media product may include both the advertised episode and another episode that is unadvertised in the television commercial. This may be the case, for example, if the media product is a boxed set of at least one full season of episodes of the television program or if the media product otherwise comprises multiple episodes of the television program.

The set-top box receiver 10 includes a media ordering module 46 that automatically initiates a purchase of the media product in response to a selection of the second option 44 during the television commercial. The media ordering module 46 may be responsive to a metadata item in the local database 24 that identifies the television commercial and further identifies the media product. Optionally, the metadata item may further identify a computer address at which the media product can be purchased.

A third option 50 may be displayed with either a television commercial or a television program. The third option 50, if selected by the subscriber 16, directs the set-top box receiver 10 to order a product or a service shown during the television commercial or the television program. By selecting the third option 50, the subscriber 16 may order a product or a service being offered for sale in the television commercial or the television program (e.g. a digital music player being advertised in a commercial or a personal computer being advertised in a paid program). Alternatively, by selecting the third option 50, the subscriber 16 may order a product or a service that is an element of the television program (e.g. a brand of shoes being worn by a player in a televised basketball game or a cellular telephone service used by a character in a movie).

The set-top box receiver 10 includes a product/service ordering module 52 that automatically orders the product or service in response to a selection of the third option 50 during the television program or the television commercial. The product/service ordering module 52 may be responsive to a metadata item in the local database 24 that identifies the television program or commercial and further identifies the product or service. Optionally, the metadata item may further identify a computer address at which the product or service can be ordered.

Either in addition to or as an alternative to the third option 50, a fourth option 54 may be displayed with the television commercial or the television program. The fourth option 54, if selected by the subscriber 16, directs the set-top box receiver 10 to initiate a search of an inventory of a local retailer for the product or the service shown during the television commercial or the television program. The results of the search are displayed by the television display 34. Thus, by selecting the fourth option 54, the subscriber 16 can see if any local retailers have the product or the service available for purchase.

The set-top box receiver 10 includes a searching module 56 that automatically initiates the search in response to a selection of the fourth option 54 during the television program or the television commercial. The searching module 56 may be responsive to a metadata item in the local database 24 that identifies the television program or commercial and further identifies the product or service. Optionally, the metadata item may further identify a computer address at which the search is to be performed.

Either in addition to or as an alternative to the third and fourth options 50 and 54, a fifth option 60 may be displayed with a television commercial for a product or a service. The fifth option 60, if selected by the subscriber 16, directs the set-top box receiver 10 to place a Voice over Internet Protocol (VoIP) call to a vendor of the product or the service. The VoIP call may be either an audio-only call or an audio-video conference call. By selecting the fifth option 60, the subscriber 16 can use the set-top box receiver 10 to talk to the vendor to get more information about the product or the service, and/or to order the product or the service.

The set-top box receiver 10 includes a VoIP calling module 62 that automatically places a VoIP call to the vendor in response to a selection of the fifth option 60 while the television commercial is in progress. The VoIP calling module 62 may be responsive to a metadata item in the local database 24 that identifies the television commercial, and further identifies a telephone number for the vendor. Optionally, the metadata item further identifies the product or the service.

Other options, such as a more-information option, may also be supported by the set-top box receiver 10.

Each on-screen option is user-selectable using the remote control 26. An option can be user-selected in a variety of ways. For example, a scroll wheel or dial of the remote control 26 can be rotated in a direction to scroll the options toward the right and can be rotated in an opposite direction to scroll the options toward the left. Alternatively, a left button 64 or another button can be repeatedly pressed to scroll toward the left, and a right button 66 or another button can be repeatedly pressed to scroll toward the right. A scroll position can be indicated by highlighting or otherwise modifying a display property of an option on the television display 34. A selection button 70 may be pressed to select the option at the current scroll position.

Based on a selection of an on-screen option, the set-top box receiver 10 identifies what type of request is being made by the subscriber 16 and routes the information accordingly based on the metadata.

Over a viewing session, the subscriber 16 may watch multiple television commercials and television programs using the set-top box receiver 10 and the television display 34 at his/her customer premise. The set-top box receiver 10 augments those of the television commercials and television programs that are identified by the metadata items 22 with on-screen options as described above.

Figure 2:
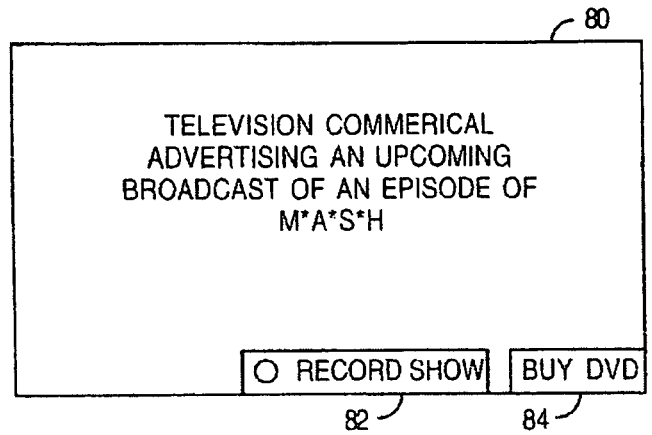
FIG. 2 is an embodiment of an augmented television commercial for an upcoming broadcast of a television program.
Figure 3:
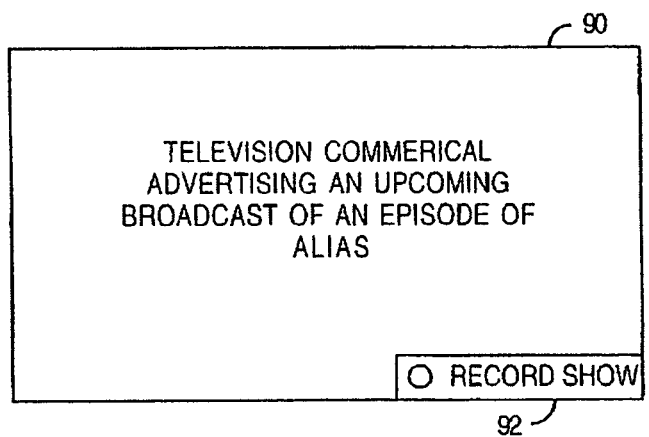
FIG. 3 is an embodiment of an augmented television commercial for an upcoming broadcast of a different television program.
Figure 4:
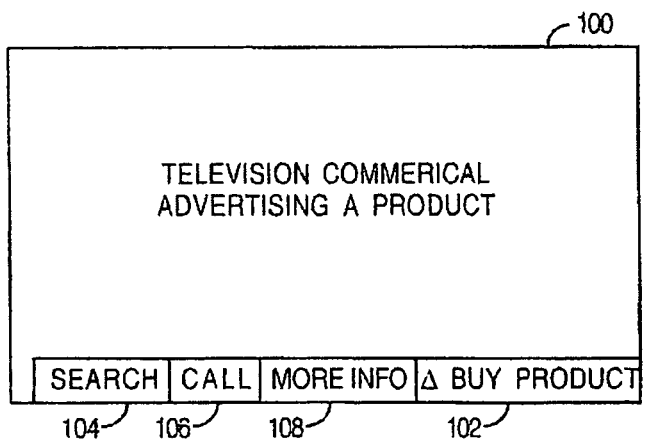
FIG. 4 is an embodiment of an augmented television commercial for a product.

FIGS. 2-4 show examples of augmented television content items generated by the set-top box receiver 10 based on metadata stored in the local database 24.

FIG. 2 is an example associated with a television commercial 80 that advertises an upcoming broadcast of an old episode of the "M*A*S*H" television program. The episode is the final episode from the third season of "M*A*S*H". Based on metadata from the local database 24 that identifies the television commercial 80, the set-top box receiver 10 augments the television commercial 80 with an option 82 to automatically record the upcoming broadcast and an option 84 to purchase the "M*A*S*H—Season Three" DVD set.

FIG. 3 is an example associated with a television commercial 90 that advertises an upcoming broadcast of a new episode of the "Alias" television program. Based on metadata from the local database 24 that identifies the television commercial 90, the set-top box receiver 10 augments the television commercial 90 with an option 92 to automatically record the upcoming broadcast. An option to purchase is not provided because the current season of "Alias" has not yet been made available for sale on DVD.

FIG. 4 is an example associated with a television commercial 100 that advertises a product. Based on metadata from the local database 24 that identifies the television commercial 100, the set-top box receiver 10 augments the television commercial 100 with an option 102 to buy the product, an option 104 to search an inventory of a local vendor for the product, an option 106 to place a VoIP call to a vendor of the product, and an option 108 to get more information on the product.

Figure 5:
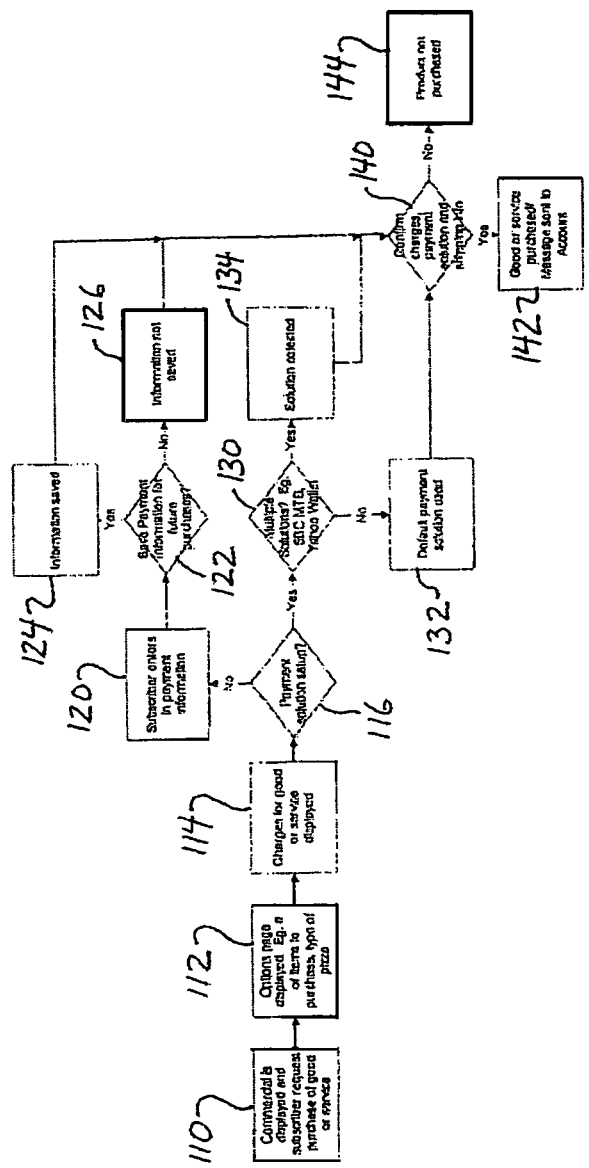
FIG. 5 is a flow chart of an embodiment of a method of performing a transaction using a set-top box receiver.

FIG. 5 is a flow chart of an embodiment of a method of performing a transaction using the set-top box receiver 10.

As indicated by block 110, the transaction is performed in response to the subscriber 16 making a request to purchase one or more goods/services based on a displayed television content item. The request may be initiated based on a selection of the second option 44 or the third option 50 described with reference to FIG. 1, a selection of the option 84 described with reference to FIG. 2, or a selection of the option 102 described with reference to FIG. 4.

As indicated by block 112, an options page is displayed in response to the request. The options page may enable the subscriber 16 to specify how many items he/she wishes to purchase, what type of items he/she wishes to purchase (e.g. a type of pizza), and delivery options. The options page is outputted by the set-top box receiver 10 for display by the television display 34.

As indicated by block 114, a display of the charges for the goods/services in the transaction is provided. The display of the charges is outputted by the set-top box receiver 10 for display by the television display 34.

As indicated by block 116, the set-top box receiver 10 determines if a payment solution has been set-up and saved for the subscriber 16. Payment solution information can be set-up and saved either prior to activating an on-screen purchasing feature or in connection with a previous transaction. Alternatively, the payment solution information can be entered by the subscriber 16 for each transaction. Examples of the payment solution include, but are not limited to, a credit card, a debit card, a micro-transaction billing platform provided by SBC, PAYPAL™ or YAHOO!'s wallet feature.

As indicated by block 120, if no saved payment solution exists in the set-top box receiver 10, the subscriber 16 enters payment information using a user-input device of the set-top box receiver 10. Examples of the user-input device include, but are not limited to, the remote control 26, a keyboard, a point-and-click device and a voice input device.

As indicated by block 122, the subscriber 16 is given an option to save the payment information for future purchases. Based on an input by the subscriber, the payment information either is saved for future purchases (as indicated by block 124) or is not saved for future purchases (as indicated by block 126).

Referring back to block 116, if at least one saved payment solution exists in the set-top box receiver 10, then flow is directed to block 130 to determine if multiple payment solutions exist for the subscriber 16. If only one payment solution exists, the one payment solution is used by default (as indicated by block 132). If multiple payment solutions exist, the subscriber 16 uses the user-input device to make a selection of one of the payment solutions to use in this transaction (as indicated by block 134).

As indicated by block 140, the set-top box receiver 10 enables the subscriber 16 to confirm the final charges, payment solution and shipping information for the order. If the subscriber 16 confirms the order, the good or service is purchased and a message is sent to an account (as indicated by block 142). If the subscriber 16 does not confirm the order, the good or service is not purchased (as indicated by block 144).

The herein-disclosed acts performed by the set-top box receiver 10 may be directed by one or more computer processors 150. The computer processor(s) 150 may perform acts based on computer-readable program code stored by a computer-readable medium.

It will be apparent to those skilled in the art that the disclosed embodiments may be modified in numerous ways and may assume many embodiments other than the particular forms specifically set out and described herein. For example, the list of options displayed horizontally in FIGS. 2-4 may be displayed vertically in alternative embodiments.

As another example, other network-enabled devices can be substituted for the set-top box receiver 10. Examples of other network-enabled devices include, but are not limited to, a personal computer, a personal digital assistant, and a wireless telephone.

Still further, some of the herein-disclosed acts can be performed by a network element, remotely located from the customer premise, rather than the set-top box receiver 10. For example, any one or more of the acts of receiving the metadata, storing the metadata in a database, receiving television commercials and programs, and augmenting the television commercials and programs identified by the metadata in the database with on-screen options can be performed by the network element rather than the set-top box receiver 10. These acts may be directed by one or more computer processors, at the network element, based on computer-readable program code stored by a computer-readable medium.

Yet still further, the herein-disclosed embodiments can be adapted to augment audio-only content items rather than television content items.

Referring to FIG. 6, an illustrative embodiment of a general computer system is shown and is designated 600. The set-top box receiver described above may further include one or more of the features of the general computing system. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. Moreover, the computer system 600 can include a main memory 604 and a static memory 606, that can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). Additionally, the computer system 600 may include an input device 612, such as a keyboard, and a cursor control device 614, such as a mouse. The computer system 600 can also include a disk drive unit 616, a signal generation device 618, such as a speaker or remote control, and a network interface device 620.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
    receiving television content at a television receiver, wherein the television content includes a first identifier, and wherein the television content is a commercial for an upcoming episode of a particular program;
    determining whether the first identifier matches at least one of a plurality of identifiers included in metadata items stored at the television receiver;
    in response to determining that the first identifier matches at least one identifier associated with at least one metadata item, augmenting the television content with at least one user-selectable option indicated by the at least one metadata item to generate augmented television content; and
    sending the augmented television content from the television receiver to a display device to display the augmented television content,
    wherein the at least one user-selectable option is displayed simultaneously with the television content, and
    wherein the at least one user-selectable option includes:
        a first option to record the upcoming episode to a memory of the television receiver; and
        conditioned on a season of the particular program that includes the upcoming episode being available for purchase, a second option to initiate a purchase of the season of the particular program.

2. The method of claim 1 wherein the at least one user-selectable option is selectable via a remote control device.

3. The method of claim 1, further comprising receiving a request to purchase the season of the particular program in response to a selection of the second option.

4. The method of claim 1, wherein the metadata items are received at the television receiver via a first communication medium and wherein the television content is received at the television receiver via a second communication medium that is different from the first communication medium.

5. A device comprising:
    a memory to store executable instructions and to store metadata items associated with television content;
    a network interface device to receive the television content; and
    a processor to execute the instructions and to cause the device to perform operations of:
        receiving the television content, wherein the television content includes a first identifier;
        determining whether the first identifier matches at least one of a plurality of identifiers included in the metadata items;
        in response to determining that the first identifier matches at least one identifier associated with at least one metadata item, augmenting the television content with at least one user-selectable option indicated by the at least one metadata item to generate augmented television content;
    sending the augmented television content from the device to a display device to display the augmented television content, wherein the at least one user-selectable option is displayed while displaying the television content and wherein the at least one user-selectable option includes a first option to initiate a search of inventories of a plurality of local retailers for a product associated with the television content; and
    in response to a selection of the first option, sending results of the search from the device to the display device.

6. The device of claim 5, wherein the device comprises a set top box.

7. The device of claim 5, wherein the device comprises a personal computer.

8. The device of claim 5, wherein the device comprises a personal digital assistant.

9. The device of claim 5, wherein the device comprises a wireless telephone.

10. The method of claim 3, further comprising determining if a payment mechanism has been set-up and saved for a subscriber of the television content in response to receiving the request.

11. The device of claim 5, wherein the television content comprises on-demand content.

12. The method of claim 10, further comprising receiving payment information when no payment mechanism has been set-up and saved for the subscriber.

13. The method of claim 10, further comprising determining if multiple payment mechanisms have been set-up and saved for the subscriber.

14. The method of claim 10, further comprising receiving a selection of one payment mechanism from multiple payment mechanisms.

\* \* \* \* \*